United States Patent [19]

Pszolla et al.

[11] Patent Number: 4,658,635
[45] Date of Patent: Apr. 21, 1987

[54] SIMULATOR FOR AERODYNAMIC INVESTIGATIONS OF MODELS IN A WIND TUNNEL

[75] Inventors: Hartmut Pszolla; Werner Baumert; Wolfgang Lorenz-Meyer, all of Göttingen, Fed. Rep. of Germany

[73] Assignee: Deutsche Forschungs- und Versuchsanstalt, Bonn, Fed. Rep. of Germany

[21] Appl. No.: 838,612

[22] Filed: Mar. 11, 1986

[30] Foreign Application Priority Data

Mar. 13, 1985 [DE] Fed. Rep. of Germany ....... 3508937

[51] Int. Cl.4 ............................................. G01M 9/00
[52] U.S. Cl. ........................................ 73/147; 73/865
[58] Field of Search ............... 73/147, 862.04, 432 SD

[56] References Cited

U.S. PATENT DOCUMENTS 4,112,752 9/1978 Hafner et al. ......................... 73/147
4,522,074 6/1985 Hafner ................................. 73/147

Primary Examiner—Donald O. Woodiel
Attorney, Agent, or Firm—Thomas & Kennedy

[57] ABSTRACT

The simulator is equipped with a multipartite support comprising a part for the accommodation of a model. The parts of the support are arranged telescopically in the form of an approximate semicircle. Hydrostatic bearings are used as mountings.

3 Claims, 1 Drawing Figure

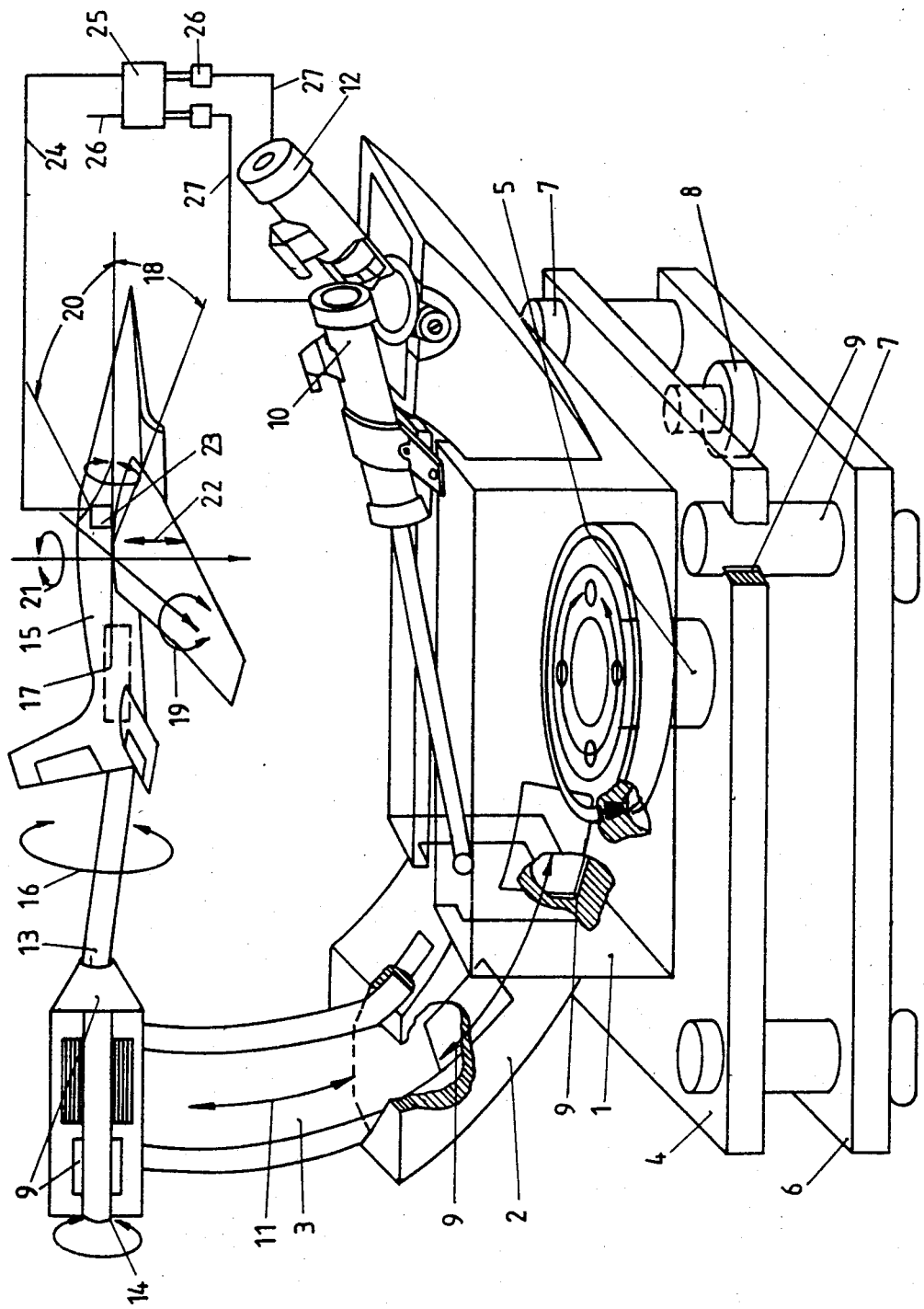

SIMULATOR FOR AERODYNAMIC INVESTIGATIONS OF MODELS IN A WIND TUNNEL

The invention relates to a simulator for aerodynamic investigations of models in a wind-tunnel, the simulator having a multipartite support comprising a part for the accomodation of the model and a mounting holding the parts of the support together. In carrying out aerodynamic investigations of models in a wind-tunnel, the model must be positioned relatively to the wind-tunnel and must be held while measurements are being made. Furthermore, the forces occurring in the model must be measured, to which end it is customary to use a scale.

Known simulators for aerodynamic investigations of models in a wind-tunnel comprise a multipartite support, the parts of which are mounted in relation to each other by means of friction-bearings or also ball and roller-bearings, the parts being adjusted in relation to each other by means of spindle-transmissions. Use may also be made of electric motors and positioning cylinders. The adjustement, however, covers at the most two degrees of freedom and the model can therefore be adjusted in two directions only. If the model is to be adjusted in other directions, another support must be used. Due to their design, known simulators are not sufficiently rigid for many applications. Play in the bearings and drives of the adjusting units leads, to incorrect interpretations of the position of the model in the wind-tunnel, on the one hand, and of the forces and movements arising, on the other hand. When measurements are being made in the wind-tunnel, flow-separation leads to self-excited oscillations in the model. Inadequate simulator rigidity, in the case of an unfavourable arrangement, leads to reinforcement of these oscillations due to the appearance of resonance-phenomena. Oscillations in the model in turn disturb the flow-pattern around the model in the wind-tunnel and, during aerodynamic investigations, this produces an error of unknown magnitude. In the case of unfavourable arrangements, the error may be of the same order of magnitude as the measurements obtained, so that satisfactory predictive measurements are no longer possible. It is impossible, with known simulators to carry out static measurements on oscillation-free models. The measurements may be regarded at most as quasi-static, with the measurements obtained containing more or less errors.

It is an object of the invention to indicate a simulator of the type described at the beginning hereof, by means of which it is possible to transfer to the model antiresonances which oppose the self-excited oscillations in the model, so that the model is finally held by the simulator, in the wind-tunnel, steady and largely free from oscillation. This is intended to make static measurements as free as possible from error. On the other hand, it is also to be possible to carry out dynamic measurements, in the case of which a predetermined pattern of movement is to be imposed by the simulator upon the model. This is intended to make it possible to carry out in the wind-tunnel manoeuvres by aircraft, rockets and motor-vehicles and to assess them by measurement techniques.

This is accomplished, according to the invention, in that the parts of the support are arranged telescopically in the form of an approximate semicircle, with hydrostatic bearings being used as mountings. The arrangement of the parts of the support in the form of a semicircle is essential, since this makes it possible to use the conventional stern-support which allows the model to be held in the wind-tunnel by the support as free as possible from interference, and to be positioned therein. The semicircular configuration per se frequently makes it possible to vary the angle of incidence. In conjunction with the stern-support, it is possible to simulate rolling movements. If the semicircular arrangement as a whole can be rotated, by means of a suitable mounting, about a vertical axis, the angle of sideslip can be adjusted and yawing movements can be simulated. The use of hydrostatic bearings, instead of friction—or roller-bearings, substantially increases the rigidity of the simulator, and this is necessary to allow the model to be held steady by the application of antiresonances. This also makes it possible to measure unsteady forces. It is to be understood that accurately defined model oscillations are to be imposed upon the simulator. Existing possibilities cover rolling, pitching, yawing and vertical oscillations. The amplitude, frequency and even the function of these oscillations can be altered if necessary. The design of the simulator according to the invention makes it possible to simulate the manoeuving properties of aircraft, rockets, motor-vehicles and the like, in a wind-tunnel, with maximal simulator rigidity. This makes it possible to predetermine and establish the patterns of movement, so that they take place, during a manoeuvre, in known fashion. Patterns of movement may also be completed step-wise one after the other. Hydrostatic bearings substantially improve simulator rigidity. These bearings operate virtually without play and without wear and can be adjusted to a high degree of accuracy. The oil-cushion contained in the hydrostatic bearing prevents the transfer of solid-borne sound to the model. Even solid-borne sound may lead to erroneous measurement results through the measuring elements of the scale carried by the model and the aerodynamics of the model.

Each rotating or linear cylinder preferably comprises an electro-hydraulic control-valve. The model is equipped with an oscillation pick-up in order to measure the oscillations, especially the accelerations, in the model and, during stationary measurements, to apply the necessary antiresonance through the corresponding hydrostatic bearing. Each hydrostatic bearing is associated with a pressure-source, or a connection to a pressure-source, with the above-mentioned electro-hydraulic control-valve, and with a linear-cylinder or a rotating cylinder, depending upon the movement involved.

The invention is described hereinafter in greater details, in conjunction with an example of embodiment. The drawing attached hereto is a diagrammatical representation of the simulator.

The main components of the support are parts 1, 2, 3 which are mounted to be telescopically displaceable into each other. Part 1 is not displaceable but is adapted to rotate upon a supporting plate 4 about a vertical axis. The mounting comprises a dove-tail guide and a rotating cylinder 5. Supporting plate 4 is, in turn, mounted vertically upon a baseplate 6 by means of posts 7. Control of the vertical movement is obtained by means of one or more linear cylinders 8. The parts are guided and held by means of hydrostatic bearings 9—each of special design, so that they can move appropriately in relation to each other. Thus part 1 of the support can only rotate, but part 2 is mounted in part 1 so that it is displaceable in a semicircle. To this end, use is made of a linear cylinder 10, the piston-rod of which passes through a slot in part 1 and is hinged to part 2. Part 3 moves in part 2 as shown by arrow 11, this movement being controllable by a linear cylinder 12.

Mounted rotatably at the free end of part 3 of the support, in a hydrostatic bearing 9, is a stern-support 13, a rotating cylinder 14 being provided to cause the stern-support to rotate in relation to part 3 of the support. By means of cylinder 14, stern-support 13 can be rotated about its longitudinal axis, allowing model 15 to roll, i.e. to carry out a movement in the direction of arrow 16. Model 15 is connected to and suspended by, stern-support 13, through a scale 17. It may be set up, positioned and adjusted in different spatial directions. Angle of incidence 18 can be set up and adjusted by means of linear cylinders 10, 12, corresponding to a pitching movement in the direction of arrow 19. Angle of side-slip 20, i.e. a yawing movement in the direction of arrow 21, may be obtained by adjusting rotating cylinder 5. The height of the model, in the direction of arrow 22, is adjusted by means of linear cylinder 8.

Arranged on or in model 15 are one or more oscillation pick-ups 23, the purpose of which is to determine oscillations arising and excited in the model as a result of the flow around it. By means of a lead 24, shown diagrammatically, measuring pulses are fed to an evaluation and control-device 25. This generally electronically controlled device also comprises a connection 26 for a line arriving from a source of hydraulic power, a pump, or the like. Hydraulic lines and electrical leads run from evaluation and control-device 25 to control-valves 26, only two of which are shown. It is to be understood that a control valve 26 is provided for each rotating cylinder 5, 14 and for each linear cylinder 8, 10, 12. Cylinders 5, 8, 10, 12, 14 are supplied with, and controlled by, hydraulic fluid through corresponding lines 27. The device described makes it possible to measure oscillations, arising in the model as a result of the flow around it, by means of oscillation pick-ups 23, to analyze them and then to modulate the resonances, i.e. to produce antiresonances in model 15 by corresponding actuation of control-valve 26, so that the two oscillations cancel each other out and the model remains steady. It is under these conditions that stationary measurements should be carried out. It is also possible, however, to carry out unsteady measurements, i.e. to cause cylinders 5, 8, 10, 12, 14 to carry out a specific pattern of movements which can be controlled by means of a process-control computer as a component of evaluation and control-device 25. In this way, the model carries out a specific manoeuvre, the corresponding forces and loads being measured by means of scale 17.

The embodiments of the invention in which an exclusive property or privilege is claimed are defined as follows:

1. A simulator for aerodynamic investigations of models in a wind-tunnel, said simulator having a multipartite support comprising a part for the accomodation of the model and a mounting holding the parts of the support together, said parts of the support being arranged telescopically in the form of an approximate semicircle; and hydrostatic bearings being used as mountings.

2. A simulator according to claim 1, wherein each rotating—or linear-cylinder comprises an electrohydraulic control-valve and wherein the model is provided with an oscillation pick-up.

3. A simulator according to claims 1 and 2, capable of eradicating unsteady movements occurring in the model as a result of aerodynamic excitation by applying antiresonances, thus making stationary positioning of the model possible.

* * * * *